United States Patent [19]

Ernst

[11] Patent Number: 4,857,421
[45] Date of Patent: Aug. 15, 1989

[54] ALKALI METAL THERMOELECTRIC GENREATOR

[75] Inventor: Donald M. Ernst, Leola, Pa.
[73] Assignee: Thermacore, Inc., Lancaster, Pa.
[21] Appl. No.: 271,594
[22] Filed: Nov. 14, 1988
[51] Int. Cl.[4] .......................................... H01M 10/39
[52] U.S. Cl. ................................. 429/104; 429/112; 429/120
[58] Field of Search ............... 429/104, 102, 101, 120, 429/34, 112, 72, 193, 11

[56] References Cited

U.S. PATENT DOCUMENTS

| | | | |
|---|---|---|---|
| 3,458,356 | 7/1969 | Kummer | 429/11 |
| 4,042,757 | 8/1977 | Jones | 429/11 |
| 4,049,877 | 9/1977 | Saillant | 429/11 |
| 4,098,958 | 7/1978 | Bettman | 429/11 |
| 4,175,164 | 11/1979 | Cole | 429/11 |
| 4,505,991 | 3/1985 | Weber | 429/11 |
| 4,510,210 | 4/1985 | Hunt | 429/11 |

*Primary Examiner*—Anthony Skapars
*Attorney, Agent, or Firm*—Martin Fruitman

[57] ABSTRACT

An alkali metal heat engine. A thermoelectric generator which circulates alkali metal through a cationic barrier to produce electricity. The device is capable of operating in a reduced gravity or gravity-free environment and without mechanical pumps because it collects and recirculates the liquid alkali metal with capillary wick structures. One capillary wick moves the alkali metal from the cooler side of the barrier to the hotter side, and another wick is used as a bypass structure to recirculate the undiffused alkali metal back to the heat source.

15 Claims, 1 Drawing Sheet

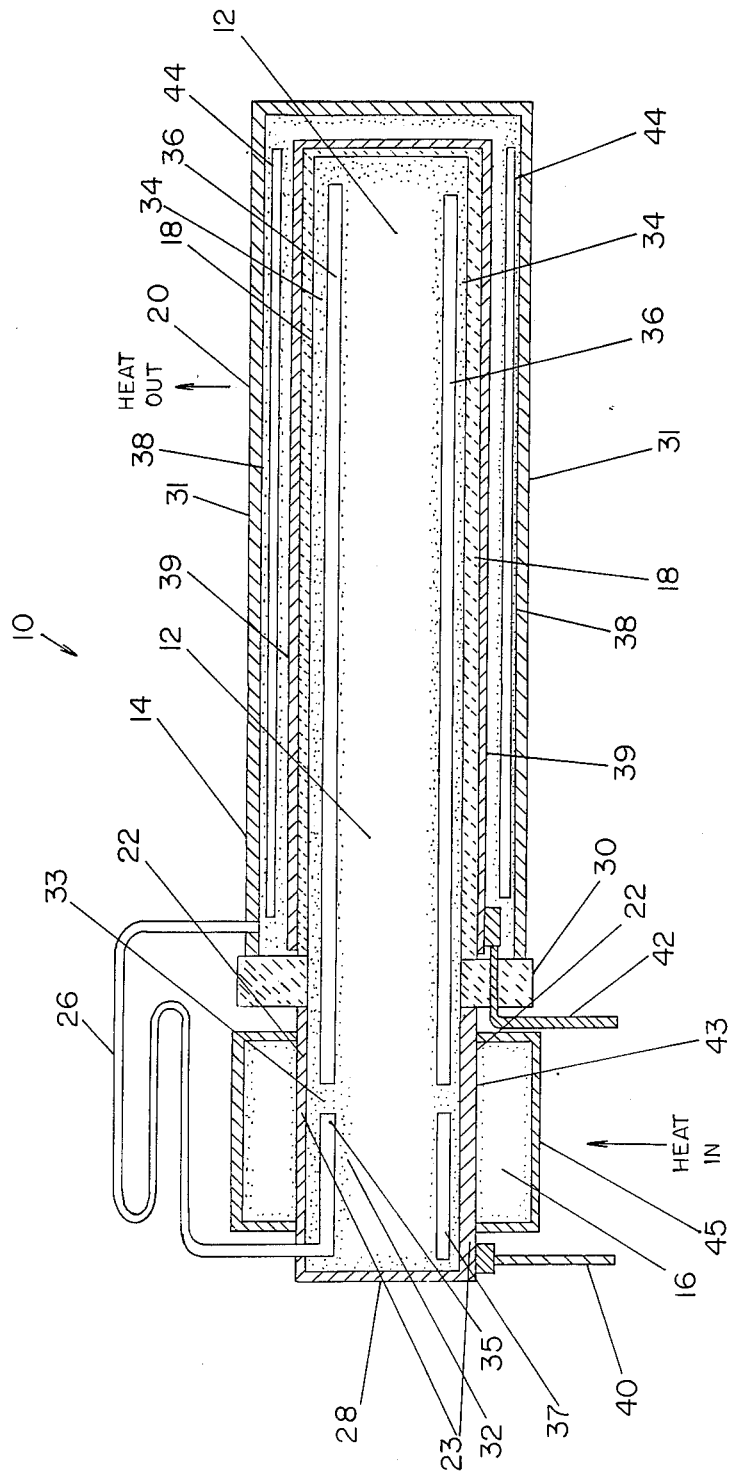

ALKALI METAL THERMOELECTRIC GENREATOR

SUMMARY OF THE INVENTION

This invention relates generally to thermal generation of electrical current, and more specifically to a thermoelectric generator which uses an alkali metal as a working fluid and includes a porous barrier which selectively passes ions of the alkali metal.

Such thermoelectric generators, sometimes referred to as heat engines, have been described in various U.S. patents including U.S. Pat. No. 3,458,356 by Kummer et al which explain the basic premise of such devices. Thermoelectric generators using liquid alkali metals operate on the basis of the electrical potential difference created when the ionized alkali metal migrates through a barrier which restricts passage of the elemental form of the alkali metal. The electrical voltage is then developed across the porous barrier.

This action is powered by the heating of the alkali metal in one chamber, from which the metal ions pass across the barrier into a second chamber, one surface of which is cooler. The hotter chamber contains both liquid and vapor and is at a higher vapor pressure than the second chamber because of its higher temperature. Moreover, while, as with any heated vapor or gas, it includes ionized particles, normally the ions are constantly being recombined into elemental material and reionized, therefore yielding no net electrical effect.

In a thermoelectric generator such as that considered here, the selective barrier which allows only positive metal ions to pass through and restricts neutral elemental metal to the hotter chamber leaves the hotter chamber with a net negative charge. The higher vapor pressure in the hotter chamber is the mechanism which moves the ions through the barrier and into the second, lower pressure chamber. The ions, once through the barrier, recombine into elemental metal and evaporate, later condensing on the cooler surface. Nevertheless, they have transferred electrical charge across the barrier so that it can be returned through an outside electrical circuit while producing conventional electrical effects such as heat or work.

As described above, the thermoelectric generator would function only intermittently, but methods have been devised to permit continuous operation. These consists essentially of recirculating the condensed alkali metal from the cooler surface back to the hotter chamber while applying heat to the hotter chamber and cooling the cooler surface. By such means, the continuous application of heat can be used to continously generate electricity.

One critical item in this process is the selective barrier which passes ionized alkali metal, but restricts elemental, neutral materials. The Kummer et al patent (U.S. Pat. No. 3,458,356) describes several compositions for such barriers, which vary with the alkali metal used as the working fluid, but in the preferred embodiment of the present invention, which uses sodium for a working fluid, the barrier is constructed of beta double prime type alumina, and its specific material is not to be considered a part of this invention.

As noted above, in order to operate the thermoelectric generator described here in a continuous manner, it is also necessary to recirculate the condensed alkali metal back from the cooler surface to the hotter chamber. Various means have been suggested to accomplish this recirculation, including mechanical pumps, electromagnetic pumps, and, in U.S. Pat. No. 4,042,757 by Jones, a capillary wick.

However, there is also another function performed within the thermoelectric generator, and it appears to be so subtle that no prior art patents have even addressed it. That function is the collection of the condensed working fluid so that it can be recirculated. Clearly, all prior art alkali metal thermoelectric generators have been designed for terrestrial use and, therefore, it has been assumed that all condensing working fluid would flow downward and be collected at the lowest point of the structure. Not only do the previously noted Kummer et al and Jones patents describe essentially vertically oriented cylindrical structures, but so do all the other prior art sources in the field. They are, therefore, all earthbound.

However, scientific and industrial effort is no longer so limited, and it is now an advantage and may soon be a necessity to operate an alkali metal thermoelectric generator in space, out of the influence of gravity. The present invention permits such operation. Rather than using gravity to collect the condensed working fluid for recirculation and to distribute it to the heated surface, the present invention accomplishes these collection and distribution functions by capillary structures. Since such capillary structures are not dependent upon gravity, the present invention, unlike all previous alkali metal thermoelectric generators, is available for use in a gravity free or essentially gravity free environment or in any orientation in a gravity environment.

BRIEF DESCRIPTION OF THE DRAWING

The FIGURE is a cross section view of the preferred embodiment of the invention.

DETAILED DESCRIPTION OF THE INVENTION

The FIGURE is a cross section view of the preferred embodiment of the invention shown in a horizontal orientation to better emphasize the device's independence from gravity for its operation. The cross section shown can either be a cross section of a cylinder along its axis or a cross section taken along one dimension of a planar configuration. In both configurations, the present invention will operate both without the aid of gravity and in a gravity field regardless of orientation.

The FIGURE shows the preferred embodiment of thermoelectric generator 10 constructed of two sealed but interconnected chambers 12 and 14, Chamber 12, the heated chamber, which is subjected to heat from heat pipe 16, has one wall 18 which is also a common boundary with cooled chamber 14 from which heat is removed by a heat sink at region 20.

Common boundary wall 18 is constructed of a unique material which is selectively porous to the alkali metal working fluid which is contained within thermoelectric generator 10. As is well established in the art, common boundary 18 is porous to the alkali metal when the alkali metal is ionized because the ionic state permits the alkali metal to migrate through common boundary 18, but, at the same time, common boundary 18 is impervious to neutral nonionized elemental alkali metal or any incidentally formed compounds.

In the preferred embodiment of the invention, porous boundary 18 is constructed of beta double prime type alumina to be compatible with the preferred working fluid of sodium. It should be understood that the temperature of operation the preferred embodiment 10 is such that, during operation, the sodium is in liquid and vapor form, so that it is appropriate to refer to the metal sodium as a fluid.

Most of the other sections of the walls of heated chamber 12 also serve specific purposes. Wall section 22, for instance, is constructed of a conductive material, such as a metal, in order to both heat and make electrical contact with the liquid sodium in chamber 12. Since porous boundary 18 is a nonconductive ceramic, it is necessary to have a conductive section of wall such as section 22 to make electrical contact.

Since the operation of an alkali metal thermoelectric generator requires fluid return path 26 to exist between heated chamber 12 and cooled chamber 14, it is desirable to prevent heat conduction along that path. The required heat flow path for efficient operation should be across porous boundary 18 with only cooler liquid sodium flowing through return path 26 from cooled chamber 14 to heated chamber 12, and no heat flowing in the opposite direction.

In order to minimize both heat transfer and electrical leakage in liquid return path 26, it is constructed as an indirect path such as the loop shown in the FIGURE.

Wall section 28 of heated chamber 12 is not of critical construction, except, that it must complete the enclosure and prevent leakage of sodium to the outside environment.

Cooled chamber 14 is largely constructed of metal, except, of course, for its common porous boundary 18 with heated chamber 12. It also includes an insulating section 30 to prevent electrical conduction between electrodes 40 and 42.

The major differences between the present invention and the previously available gravity dependent alkali metal thermoelectric generators are the internal construction features of the present invention. The walls of heated chamber 12 and cooled wall 31 of second chamber 14 are virtually completely covered with capillary wick structure. In the preferred embodiment these wicks are sintered powdered metals such as nickel or molybdenum.

Wick 32 and artery 35 within heated chamber 12 interconnect with fluid return path 26 and deliver liquid working fluid from fluid return path 26 to heated wall section 23 where it can be vaporized. Wick 34, covering the inside wall portions of chamber 12 which are not subject to direct heat is used as a liquid bypass path and may contact wick 32 at location 33. Since chamber 12 contains a mixture of vapor and liquid, and the walls other than heated wall section 22 are cooled and will cause some vapor which does not diffuse through barrier 18 to condense upon them, wick 34 acts to move such condensate back to heated wall section 22 for reevaporation. This recirculation system therefore permits heated chamber 12 to function without gravity or opposed to it. All prior art devices oriented the heated chamber vertically and placed the heat source at its lower end to use gravity to return undiffused sodium for reheating.

To further aid the recirculation of liquid back to heat source 16, longitudinal capillary arteries 36 are also placed within wick structure 34. These furnish low resistance fluid paths to overcome the higher flow resistance of wick 34. Arteries 36 are actually unobstructed tunnels of a size appropriate to capillarily pump the liquid sodium of the preferred embodiment. Their walls are the wick structure itself, not solid tubing, so that liquid can enter them anywhere along their length.

Arteries 35 and 37 within wick 32 are of similar construction to arteries 36 and are separated from arteries 36. Arteries 35 and 37 extend only from fluid return path 26 to heated surface 23, and are particularly desirable because wick 32 is of very fine pore structure to pump the liquid sodium from chamber 14 to heated surface 23. Arteries 35 and 37 therefore furnish a flow path with lower resistance.

Cooled chamber 14 also contains arteries 44 and wick structure 38 covering its cooled walls 31 in order to operate without the aid of gravity. As sodium ions migrate through barrier 18 and recombine in cooled chamber 14, they are evaporated and condense and the liquid forms within wick structure 31 and is therefore pumped, by capillary action in wick 38 and arteries 44, through return path 26, back to wick structure 32 within heated chamber 12.

In the preferred embodiment, part of the return path is by means of fluid return path 26, which is itself a capillary artery, however, it would be possible to use a continuous wick structure to return fluid to be heated.

The electrical connections for the electric generator 10 are made in conventional fashion.

Electrical connector 40 is attached to wall section 23 of heated chamber 12, thereby making electrical contact with the sodium in heated chamber 12. Electrode structure 39, in cooled chamber 14, is made of a porous conductor, serves as an electrical contact on the surface of porous barrier 18, and electrical connector 42 is attached to electrode structure 39 to provide the second electrical connection.

Heat pipe 16 is the means by which thermoelectric generator 10 of the preferred embodiment is heated. Although it is theoretically possible for heat to be applied directly to surfaces 22 and 23, applying heat through a heat pipe assures that it will be applied to both surfaces in a balanced manner and as it is required by each surface. Since the heat pipe will maintain a uniform temperature on its inner surface 43 while heat is applied to its outer surface 45. The uniform temperature characteristic of heat pipe 16 assures that even if, for instance, wick 34 on surface 22 were to begin to dry out because insufficient liquid were returning to it, the temperature at that point would not rise to aggravate the drying out process.

The present invention thereby fulfills all the requirements of a functioning alkali metal thermoelectric generator, but goes one step beyond what is presently available. It is indenpendent of gravity.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, alkali metals other than sodium could be used as a working fluid with appropriate changes in the porous boundary 18, and wick structures other than sintered metal could be used in parts or all of thermoelectric generator 10.

What is claimed is new and for which Letters Patent of the United States are desired to be secured it:

1. A thermoelectric generator comprising:

a sealed heated chamber with one wall portion being a first side of a wall constructed of a selectively porous material through which only ions of a working fluid can migrate;

a first capillary wick structure located in the interior of the heated chamber and in contact with a wall of the heated chamber at a heat source and at the wall portion of selectively porous material;

a second capillary wick structure located within the interior of the heated chamber and in contact with a wall of the heated chamber at a heat source;

a sealed second chamber with one wall portion being the second side of the same wall of selectively porous material as is in the heated chamber and another wall which is cooled;

a third capillary wick structure located in the interior of the second chamber and in contact with the cooled wall of the second chamber;

a capillary structure fluid return path interconnecting the second capillary wick structure within the heated chamber and the third capillary wick structure within the second chamber;

a first electrical connector attached to the heated chamber and in electrical contact with a working fluid on the wall of porous material in the heated chamber;

a second electrical connector attached to the second chamber and in electrical contact with a working fluid on the wall of porous material in the cooled chamber;

a quantity of liquifiable and vaporizable working fluid which is ionized by heating and of which only the ions can migrate through the wall portion of porous material; and at least one heat source applying heat to the heated chamber.

2. The thermoelectric generator of claim 1 wherein the working fluid is an alkali metal.

3. The thermoelectric generator of claim 1 wherein the working fluid is sodium.

4. The thermoelectric generator of claim 1 wherein the first, second and third wick structures are sintered metal.

5. The thermoelectric generator of claim 1 wherein the capillary structure fluid return path is a capillary artery.

6. The thermoelectric generator of claim 1 further including at least one capillary artery located within the first capillary wick structure.

7. The thermoelectric generator of claim 1 further including at least one capillary artery located within the second capillary wick structure.

8. The thermoelectric generator of claim 1 further including a thermal insulating means between the heated chamber and the second chamber along the fluid return path.

9. The thermoelectric generator of claim 1 wherein the thermal insulating means is the length of the fluid return path.

10. The thermoelectric generator of claim 1 further including an electrical insulating means between the heated chamber and the second chamber along the fluid return path.

11. The thermoelectric generator of claim 1 wherein the electrical insulating means is the length of the fluid return path.

12. The thermoelectric generator of claim 1 wherein the heating source is a heat pipe which heats both the wall with which the first capillary structure is in contact and the wall with which the second capillary structure is in contact.

13. The thermoelectric generator of claim 1 wherein the first capillary wick structure contacts the second capillary wick structure.

14. The thermoelectric generator of claim 1 wherein the capillary structure fluid return path is interconnected with a capillary artery within the second capillary structure.

15. The thermoelectric generator of claim 1 further including a capillary artery located within the third capillary wick structure.

* * * * *